(12) United States Patent
Moro et al.

(10) Patent No.: US 6,348,668 B1
(45) Date of Patent: Feb. 19, 2002

(54) METHOD AND APPARATUS FOR TREATING SURFACE OF TOOL

(75) Inventors: Toshio Moro; Akihiro Goto, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/462,417
(22) PCT Filed: Nov. 6, 1998
(86) PCT No.: PCT/JP98/04992
  § 371 Date: Mar. 31, 2000
  § 102(e) Date: Mar. 31, 2000
(87) PCT Pub. No.: WO99/58280
  PCT Pub. Date: Nov. 18, 1999

(30) Foreign Application Priority Data

May 13, 1998 (JP) ........................................... 10-130396

(51) Int. Cl.[7] .................................................. B23H 1/00
(52) U.S. Cl. ..................... 219/69.17; 219/69.2; 427/580
(58) Field of Search ............................ 219/69.17, 69.2, 219/69.15; 427/540, 580

(56) References Cited

U.S. PATENT DOCUMENTS

| | | | | |
|---|---|---|---|---|
| 4,596,066 A | * | 6/1986 | Inoue | 219/69.17 |
| 5,049,715 A | * | 9/1991 | Tanaka | 219/69.2 |
| 5,091,622 A | * | 2/1992 | Ohba | 219/69.17 |
| 5,651,901 A | * | 7/1997 | Mohriet et al. | 219/69.17 |
| 5,804,789 A | * | 9/1998 | Saito et al. | 219/69.17 |
| 6,086,684 A | * | 7/2000 | Saito et al. | 427/580 |

FOREIGN PATENT DOCUMENTS

| | | |
|---|---|---|
| JP | 2-224928 | 9/1990 |
| JP | 10-512 | 1/1998 |

OTHER PUBLICATIONS

International Search Report, Published 1999.

* cited by examiner

Primary Examiner—Geoffrey S. Evans
(74) Attorney, Agent, or Firm—Sughrue Mion, PLLC (57) ABSTRACT

A method having the steps of: securing a first electrode (120) to an indexing unit (121) which indexes the angle of the first electrode; modifying the first electrode (120) into a predetermined shape by a discharging operation of a second electrode (131) or a machining operation of a second tool connected and secured to a main shaft (112) which is moved in a vertical direction when the surface of the first electrode (120) is modified; changing the second electrode (131) or the second tool connected and secured to the main shaft (112) to a first tool (110) by an automatic tool changing unit; indexing the first electrode (120) to a predetermined angle of rotation by the indexing unit (121); causing discharge to occur while relatively moving the tip of the first tool (110) along the surface of the first electrode (120) such that the tip is made to be opposite to the surface of the first electrode (120) while a predetermined distance is being maintained; and forming a hard coating film on the tip of the first tool (110).

16 Claims, 8 Drawing Sheets

METHOD AND APPARATUS FOR TREATING SURFACE OF TOOL

TECHNICAL FIELD

The present invention relates to an improvement in a method and an apparatus for performing surface treatment of a tool by interposing working fluid between an electrode and the tool and by causing discharge to occur to use the energy of the discharge so as to form a hard coating film at the tip of the tool.

BACKGROUND OF THE INVENTION

A general machining operation including a machining operation of a type using a mold has frequently used a very hard material having considerable toughness. In the foregoing case, the lifetime of the tool is excessively shortened, causing productivity to deteriorate. Therefore, if the lifetime of the tool comes to an end, the tip of the tool is again ground and modified by a machine for grinding the tool. Thus, reuse of the tool is permitted. Since the re-grinding operation causes the hardened portion of the surface of the tip to be separated or removed, a re-hardening process must be performed in order to improving the hardness of the tip.

When the process for hardening the surface of the tip of the tool is performed by chemical evaporation or physical evaporation, an excessively great cost is required. What is worse, the foregoing evaporation process must be entrusted to a special contractor. Thus, there arise problems in that a great cost and excessively long time are required to complete the process and that a long delivery times runs.

Figure 8:
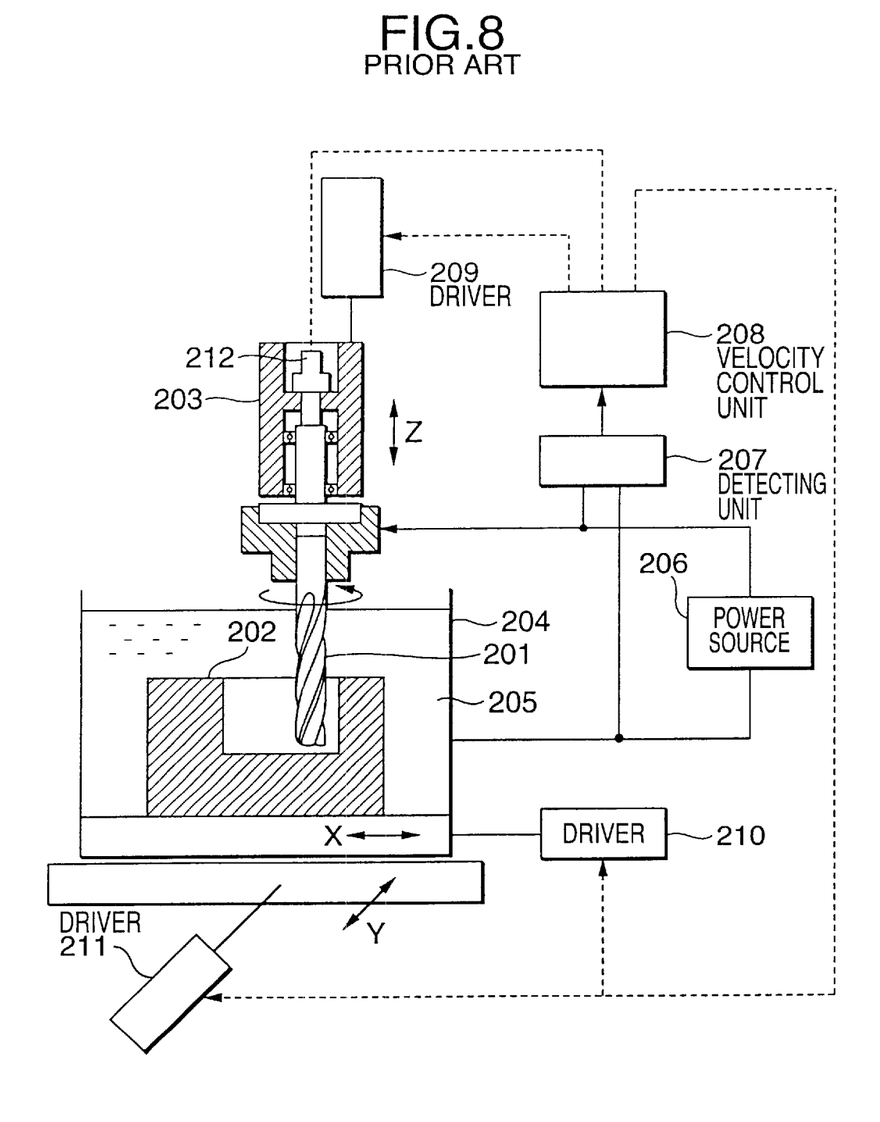
FIG. 8 is a diagram showing the overall structure of a conventional apparatus for performing surface treatment of a tool.

As a method and an apparatus for performing surface treatment of a tool using a discharge process, a technique disclosed in Japanese Patent Laid-Open No. 7-112329 is known. The surface treatment for a tool, which is the foregoing conventional technique, will now be described. FIG. 8 is a diagram showing the overall structure of the apparatus for subjecting a tool to surface treatment. Referring to FIG. 8, reference numeral 201 represents a tool, such as an end mill or drill, which must be subject to surface treatment. Reference numeral 202 represents a green compact block obtained by molding powder of a material for forming a hard coating film. The material for forming the hard coating film is obtained by sinter-molding a material prepared by mixing powder of Co (cobalt) into W—C (tungsten-carbide). Reference numeral 203 represents a main shaft for moving the tool 201 in the vertical direction (direction Z). Reference numeral 204 represents a working tank in which the green compact block 202 is secured and which is filled with working fluid 205. Reference numeral 206 represents an electric power source for applying voltage between the tool 201 and the green compact block 202. Reference numeral 207 represents an interpole detecting unit for detecting bath voltage or short circuit between the tool 201 and the green compact block 202. Reference numeral 208 represents a control unit for controlling relative movement velocity between the tool 201 and the green compact block 202 in accordance with a result of detection performed by the interpole detecting unit 207. Reference numeral 209 represents a Z-axis drive unit for moving the main shaft 203 in the direction Z together with the tool 201 by discharge. Reference numeral 210 represents an X-axis drive unit for moving the working tank 204 in the direction X together with the green compact block 202. Reference numeral 211 represents a Y-axis drive unit for moving the working tank 204 in the direction Y together with the green compact block 202. Reference numeral 212 represents a rotating unit for rotating the tool 201.

The operation of the conventional apparatus for performing surface treatment of a tool will now be described. The tool 201 held by the main shaft 203 is rotated by the rotating unit 212. The X-axis drive unit 210, the Y-axis drive unit 211 and the Z-axis drive unit 209 relatively move the tool 201 and the green compact block 202 so that an operation for grinding the green compact block 202 is performed. When the tool 201 is the end mill, grinding is performed in the direction of the side surfaces (that is, the directions X and Y). When the tool 201 is the drill, grinding is performed in the direction Z. At this time, voltage for performing a discharging process has been applied to a space between the tool 201 and the green compact block 202 from the electric power source 206. Therefore, suspension of the contact between the tool 201 and the green compact block 202 owing to proceeding of the grinding work causes discharge to occur at the gap between the two elements. Powder of the hard coating film material (W—C) floats in the gap existing between the tool 201 and the green compact block 202 owing to the operation for grinding the green compact block 202. Therefore, W—C powder is mixed into the surface of the tip of the tool 201. Hence it follows that proper control of the feed speed of the tool 201 enables a continuous operation to be performed such that grinding and discharge are repeated. As a result, a uniform hard coating film is formed on the tip of the tool. That is, according to the foregoing disclosure, the method is disclosed with which a discharging process is performed while the block containing the material for the hard coating film is being ground so that the surface treatment of the tool is performed by the discharging process.

The foregoing method has a structure formed by combining the two contrary machining processes which are the grinding process which is performed such that the block including the material for the hard coating film and the tip of the tool are made contact with each other and the discharging process in which the block including the material for the hard coating film and the tip of the tool are free from contact. Therefore, the machining operation cannot stably be performed. Moreover, a uniform hard coating film cannot be formed on the tip of the tool. Moreover, the tip of the tool wears away by friction with the block including the material for the hard coating film during the grinding process and the tip of the tool becomes dull owing to a concentration of discharge during the discharging process. Therefore, a process is required to polish the tip of the tool on which the hard coating film has been formed.

DISCLOSURE OF THE INVENTION

To radically overcome the above-mentioned problems, an object of the present invention is to provide a method and an apparatus for performing surface treatment of a tool which are capable of automatically performing a surface treatment of a tool incorporating a main cutting edge having an arbitrary angle by using a discharging process, stably and quickly obtaining a uniform hard coating film having high hardness and exhibiting excellent adhesiveness with a low cost, automatically modifying electrodes thereof and permitting unmanned operation for a long time.

According to a first aspect of the present invention, there is provided a method of performing surface treatment of a tool, comprising the steps of: securing the first electrode to an indexing unit which indexes the angle of the first electrode; changing the first tool which is connected and secured to the main shaft which is moved vertically to a second tool or a second electrode by an automatic tool changing unit when an operation for modifying the surface of the first electrode is performed; modifying the first electrode into a predetermined shape by a machining operation which is performed by the second tool or by a discharging operation which is performed by the second electrode; changing the second tool or the second electrode connected and secured to the main shaft to the first tool by the automatic tool changing unit; indexing the first electrode to a predetermined angle of rotation by the indexing unit; causing discharge to occur while relatively moving the tip of the first tool along the surface of the first electrode such that the tip is made to be opposite to the surface of the first electrode while a predetermined distance is being maintained; and forming a hard coating film on the tip of the first tool.

According to a second aspect of the present invention, there is provided a method of performing surface treatment of a tool having a structure of the method of performing surface treatment of a tool which is the first aspect of the present invention, wherein the outside shape of the first electrode secured to the indexing unit is formed into a polygonal shape.

According to a third aspect of the present invention, there is provided a method of performing surface treatment of a tool having a structure of the method of performing surface treatment of a tool which is the first aspect of the present invention, wherein the outside shape of the first electrode secured to the indexing unit is formed into a circular arc shape.

According to a fourth aspect of the present invention, there is provided a method of performing surface treatment of a tool having a structure of the method of performing surface treatment of a tool which is the first aspect of the present invention, wherein a circular-arc electrode and a polygonal electrode are arranged so as to be secured to the indexing unit.

According to a fifth aspect of the present invention, there is provided a method of performing surface treatment of a tool comprising the steps of: securing the first electrode to an indexing unit which indexes the angle of the first electrode; connecting and securing the first tool to a first main shaft which is moved vertically; modifying the first electrode to a predetermined shape by a machining operation which is performed by a second tool or a discharging operation which is performed by a second tool when an operation for modifying the surface of the first electrode is performed, the second tool and the second electrode being connected and secured to a second main shaft which is provided individually from the first main shaft and which is vertically moved; indexing the first electrode to a predetermined angle of rotation by the indexing unit; causing discharge to occur while relatively moving the tip of the first tool along the surface of the first electrode such that the tip is made to be opposite to the surface of the first electrode while a predetermined distance is being maintained; and forming a hard coating film on the tip of the first tool.

According to a sixth aspect of the present invention, there is provided a method of performing surface treatment of a tool having a structure of the method of performing surface treatment of a tool which is the fifth aspect of the present invention, wherein the outside shape of the first electrode secured to the indexing unit is formed into a polygonal shape.

According to a seventh aspect of the present invention, there is provided a method of performing surface treatment of a tool having a structure of the method of performing surface treatment of a tool which is the fifth aspect of the present invention, wherein the outside shape of the first electrode secured to the indexing unit is formed into a circular arc shape.

According to an eighth aspect of the present invention, there is provided a method of performing surface treatment of a tool having a structure of the method of performing surface treatment of a tool which is the fifth aspect of the present invention, wherein a circular-arc electrode and a polygonal electrode are arranged so as to be secured to the indexing unit.

According to a ninth aspect of the present invention, there is provided an apparatus for performing surface treatment of a tool comprising: an indexing unit for supporting the first electrode and indexing the angle of the first electrode; a main shaft which supports a rotating unit and which is moved in a vertical direction; a first tool supported by the rotating unit; accommodating means which is capable of accommodating at least either of a modifying tool or a modifying electrode and a tool which is a material which must be processed; a second modifying tool or a second modifying electrode accommodated in the accommodating means; an automatic tool changing unit for automatically changing the tool or the electrode supported by the rotating unit to the tool or the electrode accommodated in the accommodating means; an X-axis drive unit, a Y-axis drive unit and a Z-axis drive unit for relatively moving the main shaft and the first electrode in directions X, Y and Z, wherein the first tool supported by the rotating unit is changed to the second tool or the second electrode accommodated in the accommodating means by the automatic tool changing unit when an operation for modifying the surface of the first electrode is performed; the first electrode is modified into a predetermined shape by a machining operation which is performed by the second tool or by a discharging operation which is performed by the second electrode; the second tool or the second electrode is changed to the first tool by the automatic tool changing unit; the first electrode is indexed to a predetermined angle of rotation by the indexing unit; discharge is caused to occur while the tip of the first tool is being moved relatively along the surface of the first electrode such that the tip is made to be opposite to the surface of the first electrode while a predetermined distance is being maintained by the X-axis drive unit, the Y-axis drive unit and the Z-axis drive unit; and a hard coating film is formed on the tip of the first tool.

According to a tenth aspect of the present invention, there is provided an apparatus for performing surface treatment of a tool having a structure of the apparatus for performing surface treatment of a tool which is the ninth aspect of the present invention, wherein the outside shape of the first electrode secured to the indexing unit is formed into a polygonal shape.

According to an eleventh aspect of the present invention, there is provided an apparatus for performing surface treatment of a tool having a structure of the apparatus for performing surface treatment of a tool which is the ninth aspect of the present invention, wherein the outside shape of the first electrode secured to the indexing unit is formed into a circular arc shape.

According to a twelfth aspect of the present invention, there is provided an apparatus for performing surface treatment of a tool having a structure of the apparatus for performing surface treatment of a tool which is the ninth aspect of the present invention, wherein a circular-arc electrode and a polygonal electrode are arranged so as to be secured to the indexing unit.

According to a thirteenth aspect of the present invention, there is provided an apparatus for performing surface treatment of a tool, comprising: an indexing unit for supporting the first electrode and indexing the angle of the first electrode; a first main shaft which supports a rotating unit and which is moved in a vertical direction; a first tool supported by the rotating unit; a second tool or a second electrode connected and secured to a second main shaft which is provided individually from the first main shaft and which is moved in a vertical direction; an X-axis drive unit, a Y-axis drive unit and a Z-axis drive unit for relatively moving the first main shaft and the first electrode in directions X, Y and Z, wherein the first electrode is modified into a predetermined shape by a machining operation which is performed by the second tool or by a discharging operation which is performed by the second electrode when modification of the surface of the first electrode is performed; the first electrode is indexed to a predetermined angle of rotation by the indexing unit; discharge is caused to occur while relatively moving the tip of the first tool along the surface of the first electrode such that the tip is made to be opposite to the surface of the first electrode while a predetermined distance is being maintained by the rotating unit, the Xaxis drive unit, the Y-axis drive unit and the Z-axis drive unit; and a hard coating film is formed on the tip of the first tool.

According to a fourteenth aspect of the present invention, there is provided an apparatus for performing surface treatment of a tool having a structure of the apparatus for performing surface treatment of a tool which is the thirteenth aspect of the present invention, wherein the outside shape of the first electrode secured to the indexing unit is formed into a polygonal shape.

According to a fifteenth aspect of the present invention, there is provided a n apparatus for performing surface treatment of a tool having a structure of the apparatus for performing surface treatment of a tool which is the thirteenth aspect of the present invention, wherein the outside shape of the first electrode secured to the indexing unit is formed into a circular arc shape.

According to a sixteenth aspect of the present invention, there is provided an apparatus for performing surface treatment of a tool having a structure of the apparatus for performing surface treatment of a tool which is the thirteenth aspect of the present invention, where in a circular-arc electrode and a polygonal electrode are arranged so as to be secured to the indexing unit.

Since the present invention is structured as described above, the following effects can be obtained.

The method of performing surface treatment of a tool according to the first aspect of the present invention enables a tool incorporating a main edge having an arbitrary angle to automatically be subjected to surface treatment using a discharging operation. Moreover, a coating film having high hardness and exhibiting excellent adhesiveness can quickly be obtained with a low cost. In addition, the electrode can be modified by an automatic operation. The machining operation can be continued for a long time and a unmanned system can be realized.

The method of performing surface treatment of a tool according to the second aspect of the present invention attains similar effects to those obtainable from the first aspect of the present invention. Since a multiplicity of surfaces of electrodes each of which is formed into a polygonal shape can be used, continuous working duration can be elongated. Therefore, the operating rate and productivity can be improved. Moreover, the cost of the electrode can be reduced.

The method of performing surface treatment of a tool according to the third aspect of the present invention attains similar effects to those obtainable from the first aspect of the present invention. Moreover, a discharging operation of a tip of a ball end mill or the like having a free curved surface can easily be performed. In addition, the electrode can easily be manufactured.

The method of performing surface treatment of a tool according to the fourth aspect of the present invention attains similar effects to those obtainable from the first aspect of the present invention. Since change of the electrode is not required if the type of the tool is changed, the continuous working duration can be elongated. Therefore, the operating rate and productivity can be improved.

The method of performing surface treatment of a tool according to the fifth aspect of the present invention attains similar effects to those obtainable from the first aspect of the present invention. Moreover, the structure of the main shaft can be formed into a structure for performing only indexing. Thus, the number of times the tool is changed can be decreased. Thus, the productivity can be improved.

The method of performing surface treatment of a tool according to the sixth aspect of the present invention attains similar effects to those obtainable from the fifth aspect of the present invention. Since a multiplicity of surfaces of electrodes each of which is formed into a polygonal shape can be used, continuous working duration can be elongated. Therefore, the operating rate and productivity can be improved. Moreover, the cost of the electrode can be reduced.

The method of performing surface treatment of a tool according to the seventh aspect of the present invention attains similar effects to those obtainable from the fifth aspect of the present invention. Moreover, a discharging operation of a tip of a ball end mill or the like having a free curved surface can easily be performed. In addition, the electrode can easily be manufactured.

The method of performing surface treatment of a tool according to the eighth aspect of the present invention attains similar effects to those obtainable from the fifth aspect of the present invention. Since change of the electrode is not required if the type of the tool is changed, the continuous working duration can be elongated. Therefore, the operating rate and productivity can be improved.

The apparatus for performing surface treatment of a tool according to the ninth aspect of the present invention attains similar effects to those obtainable from the first aspect of the present invention.

The apparatus for performing surface treatment of a tool according to the tenth aspect of the present invention attains similar effects to those obtainable from the ninth aspect of the present invention. Since a multiplicity of surfaces of electrodes each of which is formed into a polygonal shape can be used, continuous working duration can be elongated. Therefore, the operating rate and productivity can be improved. Moreover, the cost of the electrode can be reduced.

The apparatus for performing surface treatment of a tool according to the eleventh aspect of the present invention attains similar effects to those obtainable from the ninth aspect of the present invention. Moreover, a discharging operation of a tip of a ball end mill or the like having a free curved surface can easily be performed. In addition, the electrode can easily be manufactured.

The apparatus for performing surface treatment of a tool according to the twelfth aspect of the present invention attains similar effects to those obtainable from the ninth aspect of the present invention. Since change of the electrode is not required if the type of the tool is changed, the continuous working duration can be elongated. Therefore, the operating rate and productivity can be improved.

The apparatus for performing surface treatment of a tool according to the thirteenth aspect of the present invention attains similar effects to those obtainable from the fifth aspect of the present invention.

The apparatus for performing surface treatment of a tool according to the fourteenth aspect of the present invention attains similar effects to those obtainable from the thirteenth aspect of the present invention. Since a multiplicity of surfaces of electrodes each of which is formed into a polygonal shape can be used, continuous working duration can be elongated. Therefore, the operating rate and productivity can be improved. Moreover, the cost of the electrode can be reduced.

The apparatus for performing surface treatment of a tool according to the fifteenth aspect of the present invention attains similar effects to those obtainable from the thirteenth aspect of the present invention. Moreover, a discharging operation of a tip of a ball end mill or the like having a free curved surface can easily be performed. In addition, the electrode can easily be manufactured.

The apparatus for performing surface treatment of a tool according to the sixteenth aspect of the present invention attains similar effects to those obtainable from the thirteenth aspect of the present invention. Since change of the electrode is not required if the type of the tool is changed, the continuous working duration can be elongated. Therefore, the operating rate and productivity can be improved.

BRIEF DESCRIPTION OF DRAWINGS

FIGS. 3(*a*)–3(*c*) are diagram showing principles of modifying the surface of an electrode by using a modifying tool and machining an end cutting edge of an end mill according to the first embodiment of the present invention;

FIGS. 4(*a*)–4(*d*) are diagram showing principles of modifying the surface of an electrode by using a modifying electrode and machining a peripheral cutting edge of an end mill according to a second embodiment of the present invention;

FIGS. 5(*a*)–5(*c*) are diagram showing principles of machining of a ball end mill according to a third embodiment of the present invention;

FIGS. 6(*a*)–6(*b*) are diagram showing principles of machining of a drill according to a fourth embodiment of the present invention;

BEST MODE FOR CARRYING OUT THE INVENTION

First Embodiment

Figure 1:
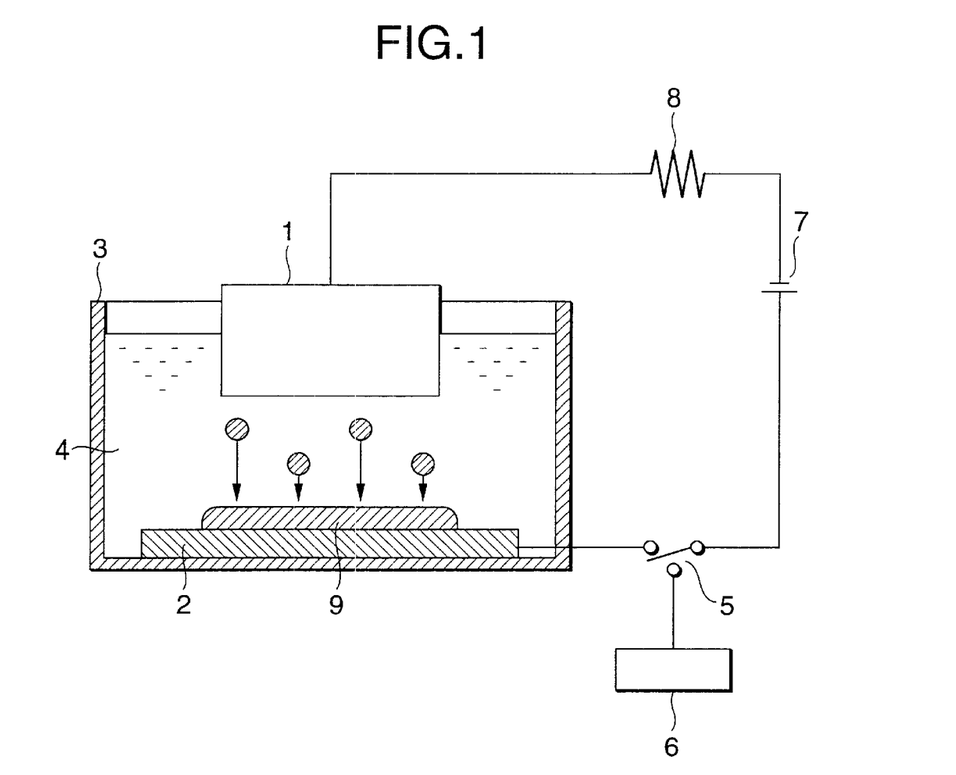
FIG. 1 is a diagram showing the concept of surface treatment using a discharging operation which is performed by a method and an apparatus for performing surface treatment of a tool according to the present invention.

FIG. 1 is a diagram showing the concept of a method and an apparatus for performing surface treatment of a tool using a discharging operation and according to the present invention. Referring to FIG. 1, reference numeral 1 represents an electrode made of a green compact obtained by compression-molding metal powder, powder of a metal compound or powder of a ceramic material, made of a sintered body of the materials or made of metal or a metal compound. Reference numeral 2 represents an object which must be machined, 3 represents a working tank and 4 represents a working fluid. Reference numeral 5 represents a switching element for performing switching of voltage and an electric current which is exerted on the electrode 1 and the object 2 which must be machined. Reference numeral 6 represents a control circuit for controlling the switching operation of the switching element 5. Reference numeral 7 represents an electric power source, 8 represents a resistor unit and 9 represents a hard coating film. Discharge caused to occur between the electrode 1 and the object 2 which must be machined is used to form the hard coating film 9 on the object 2 which must be machined.

Figure 2:
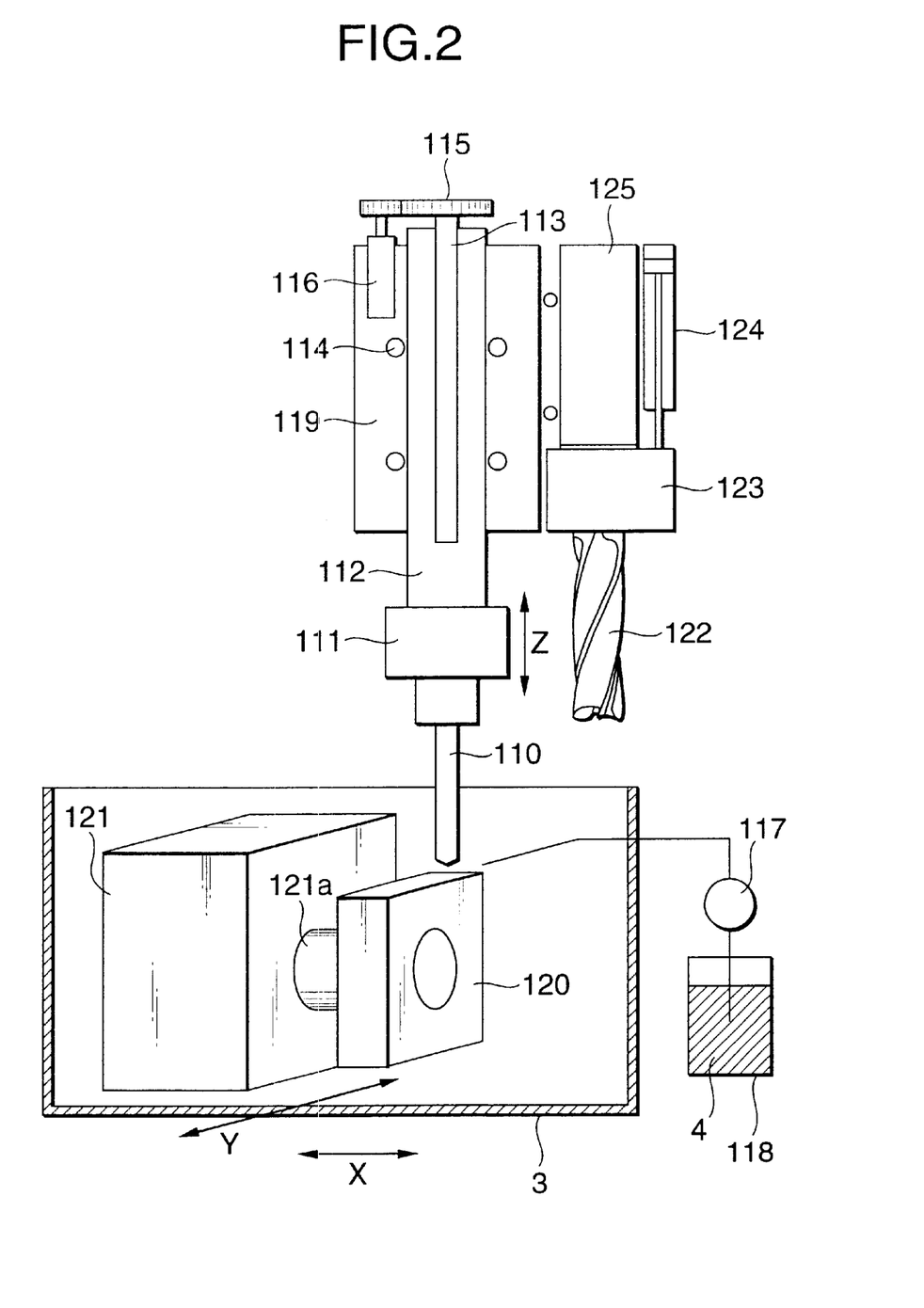
FIG. 2 is a diagram showing an apparatus for performing surface treatment of a tool according to a first embodiment of the present invention.

FIG. 2 is a diagram showing the apparatus for performing surface treatment of a tool according to a first embodiment of the present invention. Reference numeral 110 represents a tool which must be machined. Reference numeral 120 represents an electrode arranged to perform surface treatment of the tool 110 and constituted by, for example, a green compact made of $TiH_2$. The electrode 120 has a polygonal outside shape. Reference numeral 121 is an indexing unit for indexing the electrode 120 to an arbitrary angle of rotation which has been determined by a program. Reference numeral 121*a* represents an output shaft of the indexing unit 121. The electrode 120 is secured to the output shaft 121*a* of the indexing unit 121. Reference numeral 111 represents a rotating unit for supporting and rotating the tool 110, the rotating unit 111 being called a C-axis. Reference numeral 112 represents a main shaft, 113 represents a driving ball screw and 114 represents a guide for guiding and supporting the main shaft 112. Reference numeral 115 represents a gear and 116 represents a feeding control motor. The main shaft 112 is moved in the vertical direction (direction Z) by the feeding control motor 116, the gear 115 and the ball screw 113 (hereinafter called a "Z-axis drive unit"). The working tank 3 is moved in horizontal directions (directions X and Y) by drive units (not shown) (hereinafter called an "X-axis drive unit and Y-axis drive unit"). Reference numeral 117 represents a pump for supplying working fluid and 118 represents a tank for the working fluid. Reference numeral 119 represents a frame for supporting the main shaft 112.

Reference numeral 122 represents a modifying tool which is used when the electrode 120 has been worn and the surface of the electrode 120 must be modified. Reference numeral 123 represents a rotating unit, 124 represents a linear drive unit, such as a cylinder, and 125 represents a sub-main shaft. The modifying tool 122 is mounted on the rotating unit 123. The rotating unit 123 is connected to the sub-main shaft 125. The linear drive unit 124 enables the modifying tool 122 to vertically be moved. The modifying tool 122 is moved downwards only when the electrode must be modified.

Figure 3A:
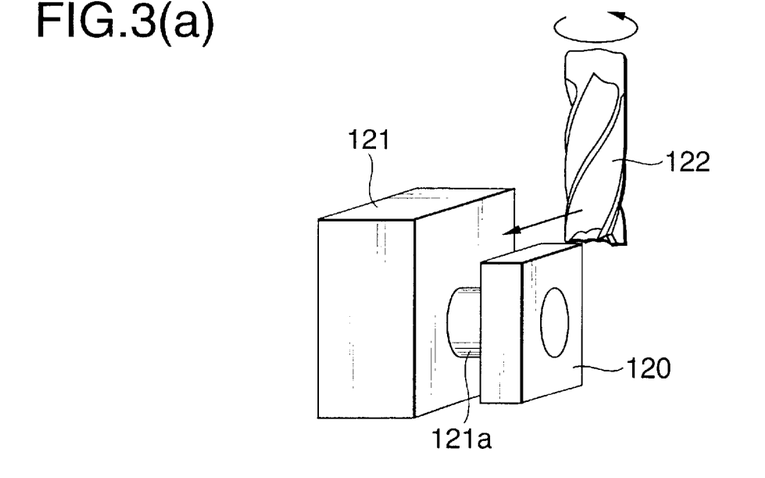
Figure 3B:
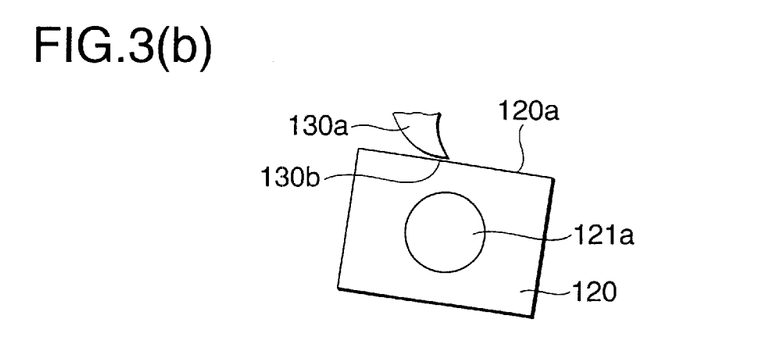
Figure 3C:
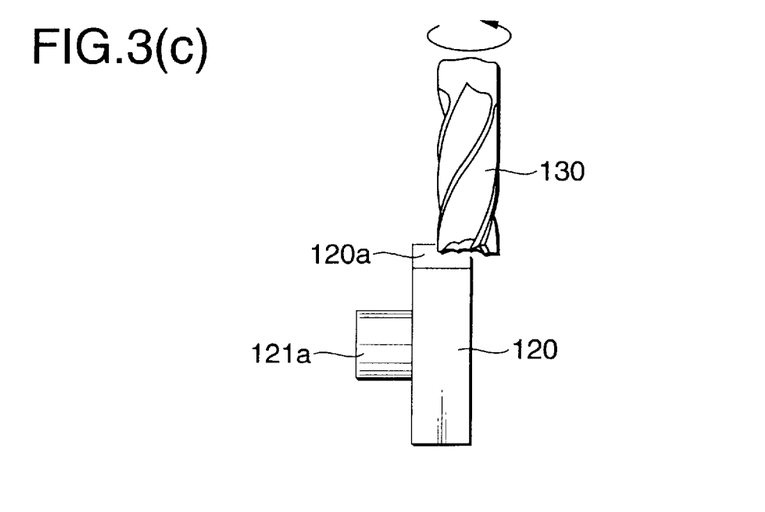
Figure 4A:
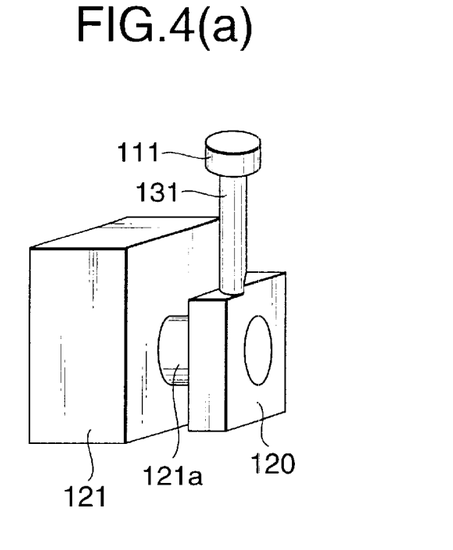
Figure 4B:
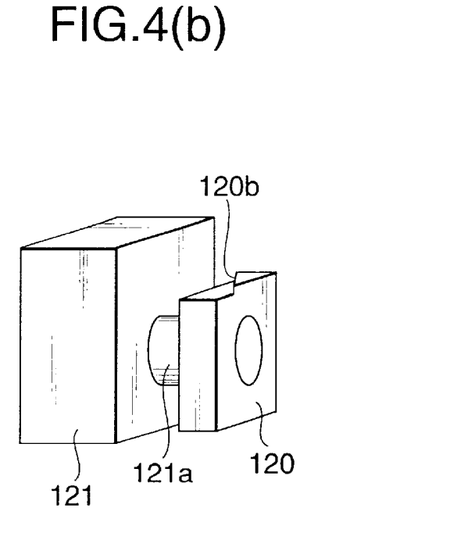
Figure 4C:
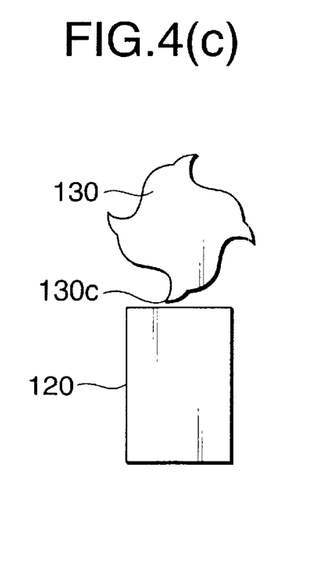
Figure 4D:
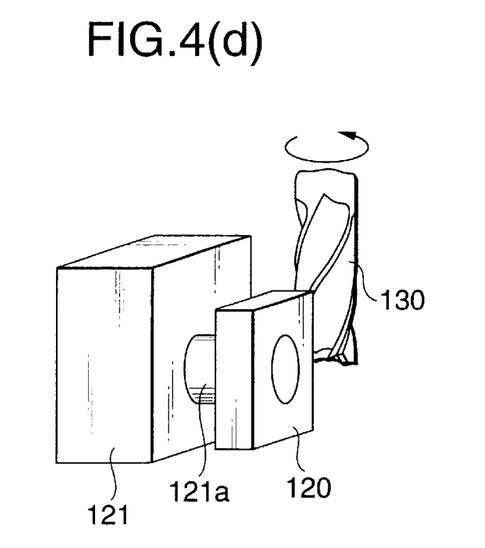

FIG. 3 is a diagram showing principles of modifying the surface of the electrode and machining of the end cutting edge according to the first embodiment of the present invention.

Referring to FIG. 3(*a*), the electrode 120 secured to the output shaft 121*a* of the indexing unit 121 is indexed to a predetermined angle by the indexing unit 121. Then, the modifying tool 122 is moved downwards by the linear drive unit 124 shown in FIG. 2. The rotating unit 123 shown in FIG. 2 is rotated at high speed so that the surface of the electrode 120 is ground, for example, in a direction indicated with an arrow, as shown in FIG. 3(a). As a result, the outer surface of the electrode 120 is finished. As described above, the surface of the electrode can be modified if the electrode is worn owing to the discharging operations.

Then, an end mill 130 is joined to the C-axis 111 shown in FIG. 2. While a proper distance (for example 10 μm to tens of μm) from the end mill 130 to the surface of the electrode 120 is being maintained by the Z-axis drive unit, pulse-shape discharge is caused to occur between the end mill 130 and the electrode 120 to perform the machining operation. That is, as shown in FIG. 3(b), the tooth face 130b of the first radial relief of the tip 130a of the end cutting edge of the end mill 130 is made to run parallel with the electrode surface 120a by inclining the electrode 120 by a required angle by the indexing unit 121. Moreover, the end cutting edge of the end mill 130 is placed on the electrode surface 120a, and then discharge is performed. As a result, the energy of the discharge causes the electrode 120 to be worn. The main component (for example, Ti (titanium)) of the electrode 120 reacts with carbon in the working fluid so that a hard coating film is formed on the tip of the end cutting edge.

When change of the tool is performed by using a usual automatic tool changing unit, automatic changing can be performed. As a result, the above-mentioned operation for modifying the surface of the electrode and the machining operation for forming the hard coating film can continuously be performed for a long time. Moreover, an unmanned system can be realized.

Second Embodiment

FIG. 4 is a diagram showing principles of modification of the surface of an electrode using a modifying electrode and machining of the peripheral cutting edge of an end mill according to a second embodiment of the present invention. Referring to FIG. 4(a), reference numeral 131 represents a modifying electrode made of copper or the like. When the surface of the electrode 120 must be modified, surface of the electrode 120 is subjected to discharge to modify the surface into a required shape. A second electrode surface 120b (refer to FIG. 4(b)) of the electrode 120 which has been modified is used to machine the tooth face of the first radial relief of a peripheral cutting edge 130c (see FIG. 4(c)) of the end mill. The indexing unit 121 is operated to perform indexing in such a manner that the second electrode surface 120b of the electrode 120 is made to be vertical. Thus, the peripheral cutting edge of the end mill 130 is aligned to the second electrode surface 120b of the electrode 120. Then angle of the face of the tooth of the end mill 130 is set by the C-axis 111 so as to be paralleled with the surface of the electrode, as shown in FIG. 4(c). Then, the Z-axis drive unit and the C-axis are operated to control two axes such that a discharge operation is performed while the end mill 130 is being spirally rotated along the surface of the electrode. In a case shown in FIG. 4(d), the second electrode surface 120b is not provided. In this case, the outer surface of the electrode is as it is used to perform the discharging operation. When the above-mentioned machining method is employed, a necessity for modifying the electrode can be omitted. The foregoing process is repeated so that surface treatment of a plurality of the overall peripheral cutting edges is completed.

Third Embodiment

Figure 5A:
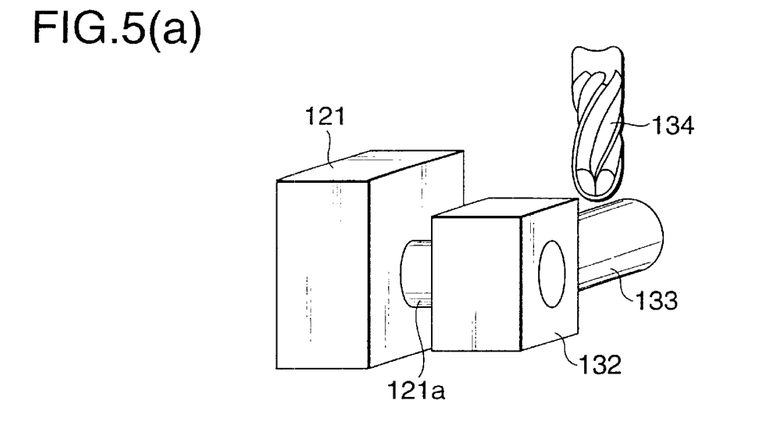

FIG. 5 is a diagram showing principles of machining of a ball end mill according to a third embodiment of the present invention. Referring to FIG. 5(a), a circular-arc electrode 133 is secured to a bed 132 arranged to secure an electrode and secured to the output shaft 121a of the indexing unit 121. Reference numeral 134 represents a ball end mill which must be machined. The tooth face of the first radial relief of the tip of the ball end mill 134 and the surface of the circular-arc electrode 133 are aligned to each other by locating the ball end mill 134 in the direction of rotation. Then, the outer surface of the circular-arc electrode 133 is used to control movement on the basis of simultaneous control of two axes performed by the Z-axis drive unit and the X-axis drive unit or the Z-axis drive unit and the Y-axis drive unit. Thus, surface treatment of the circular-arc tip of the ball end mill 134 is performed by carrying out a discharging operation. If necessary, rotation of the tool may be added.

Figure 5B:
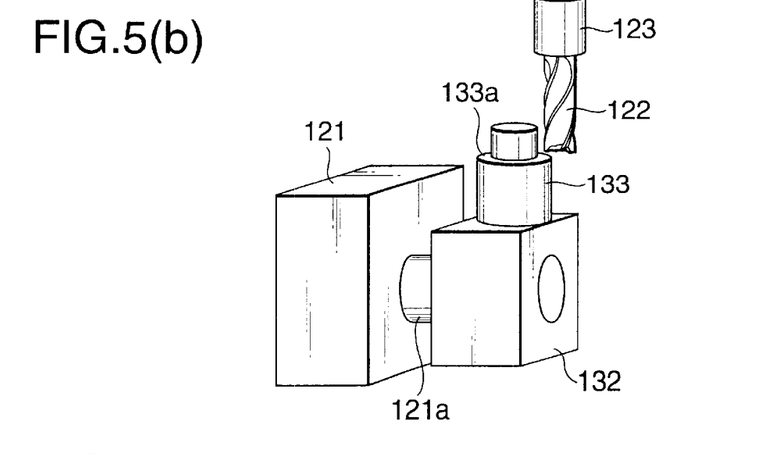

FIG. 5(b) shows an example of modification which is performed when the surface of the electrode has been worn. The indexing unit 121 is operated to stand the circular-arc electrode 133 in a vertical direction. Then, the modifying tool 122 joined to the rotating unit 123 is used to form a new electrode surface 133a. Then, the indexing unit 121 is again operated to index the circular-arc electrode 133 to the horizontal direction. Thus, surface treatment of the ball endmill 134 using discharge as shown in FIG. 5(a) is repeated.

Figure 5C:
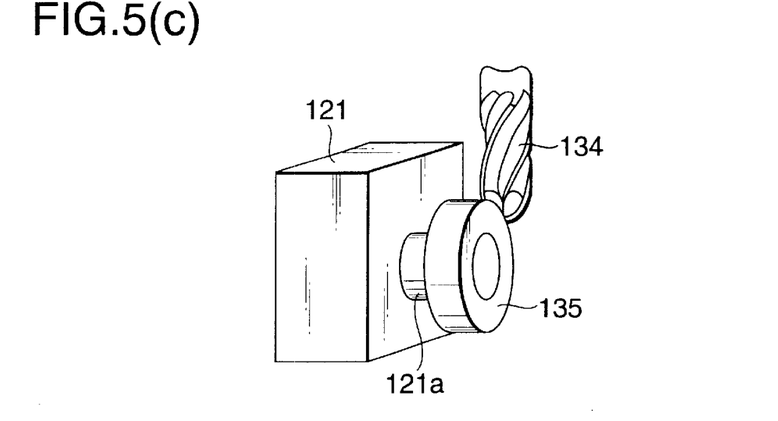

FIG. 5(c) shows a state in which the circular-arc electrode 135 has directly been joined to the output shaft 121a of the indexing unit 121. Also with the foregoing structure, surface treatment of the ball end mill 134 can be performed similarly to the structure shown in FIG. 5(a). When a modifying operation is performed if the circular-arc electrode 135 is worn due to discharge, the outer surface of the circular-arc electrode 135 can be machined by the modifying tool 122 while the circular-arc electrode 135 is being rotated by the indexing unit 121. Therefore, the modifying operation can easily be performed.

Fourth Embodiment

Figure 6A:
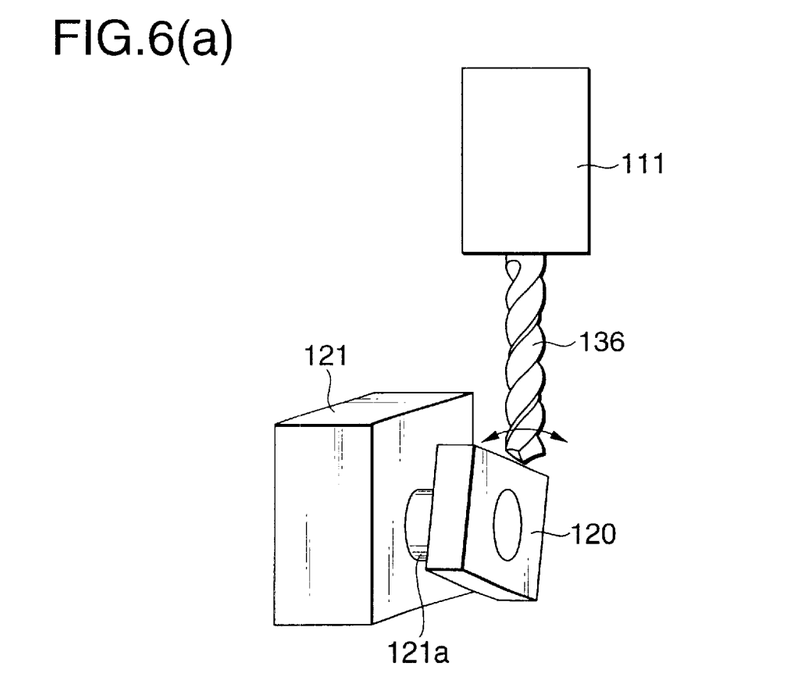
Figure 6B:
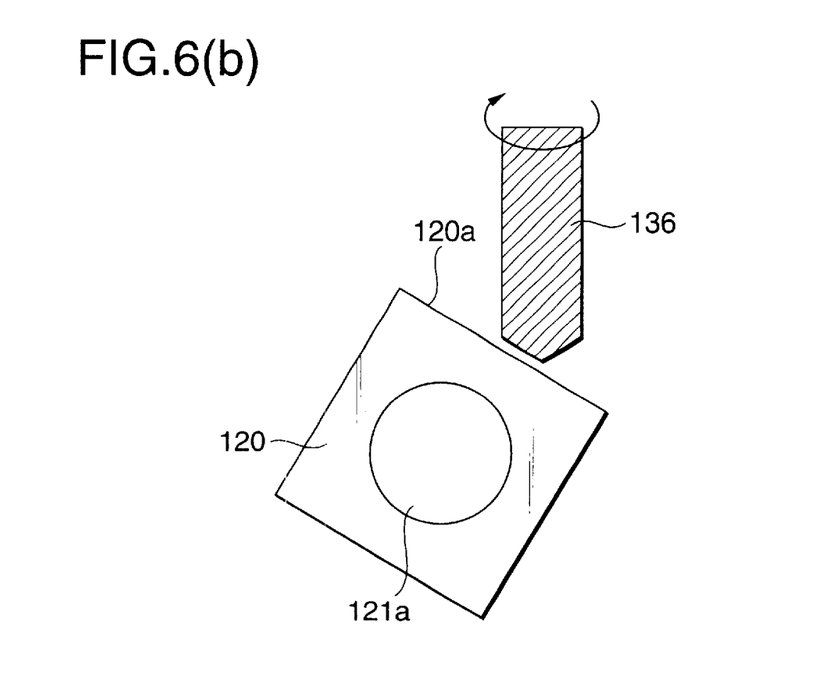

FIG. 6 is a diagram showing principles of machining of a drill according to a fourth embodiment of the present invention. The indexing unit 121 is operated to index the electrode 120 to a predetermined angle to correspond to the angle of the leading end of the drill 136. Then, the drill 136 is approached to the electrode 120 by the Z-axis drive unit such that the electrode surface 120a faces upwards. If the gap is made to be smaller than a predetermined distance, discharge is started. Hence it follows that a hard coating film can be formed on the leading end of the drill 136. If the surface treatment of the main cutting edge using discharge is completed, the electrode 120 is rotated by 90° by the indexing unit 121 or the drill 136 is rotated by 180° by the C-axis. Thus, surface treatment of the other main cutting edge using discharge is performed. As a result, the surface treatment of both of the main cutting edges using discharge can be performed.

Fifth Embodiment

Figure 7:
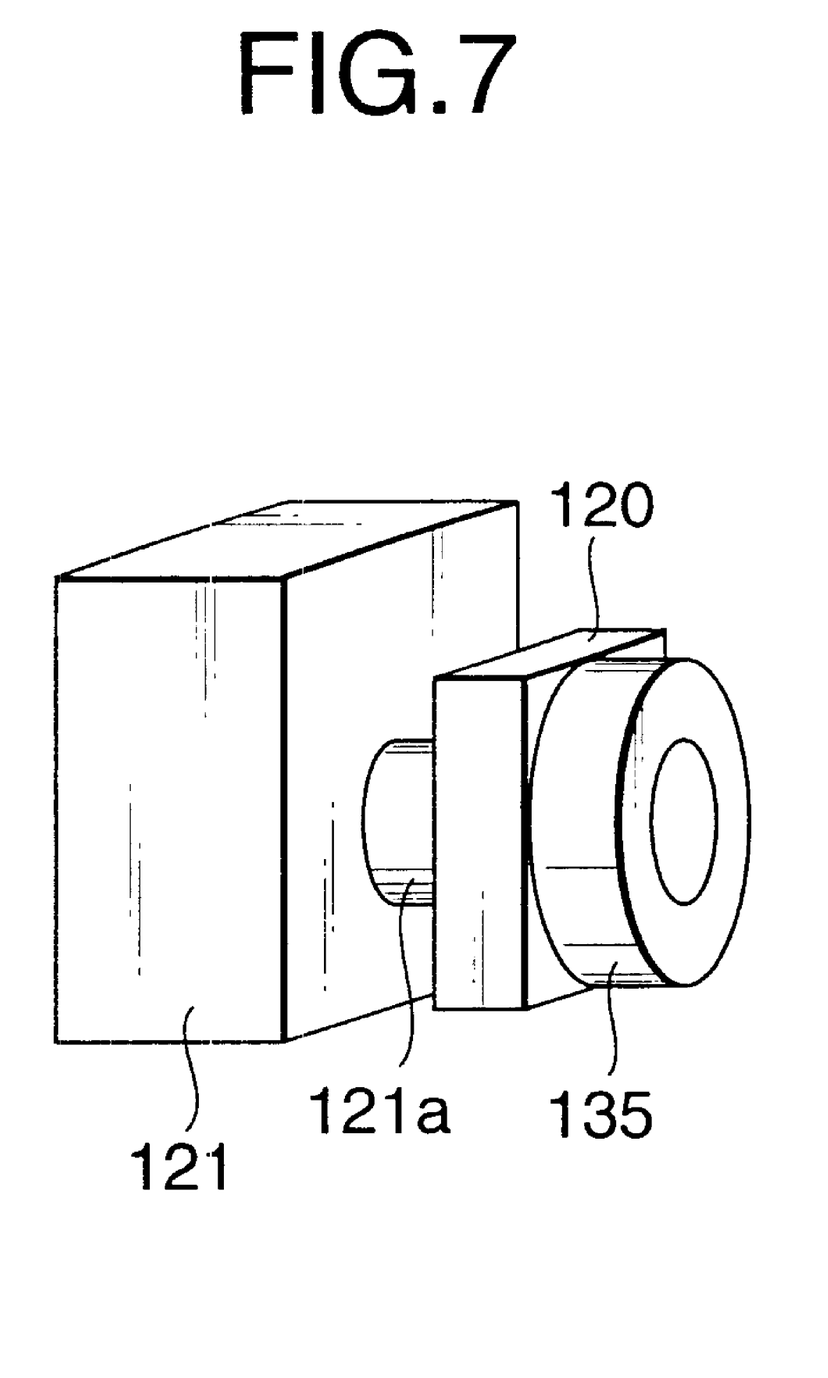
FIG. 7 is a diagram showing the structure of an electrode according to a fifth embodiment of the present invention.

FIG. 7 is a diagram showing the electrode according to a fifth embodiment of the present invention. A polygonal electrode 120 and a circular-arc electrode 135 are simultaneously joined to the output shaft 121a of the indexing unit 121. As a result of employment of the foregoing structure, change of the electrodes to correspond to a multiplicity of types of the tools, such as the ball end mill, the drill and the end mill, is not required.

Industrial Applicability

As described above, the method and the apparatus for performing surface treatment of a tool are able to quickly and stably form a hard coating film having high hardness and exhibiting satisfactory adhesiveness on the tip of the tool with a low cost. Moreover, the electrode can automatically be modified. In addition, an unmanned operation can be performed for a long time. Therefore, the structure of the present invention can preferably be employed in a process for performing surface treatment of a tool.

What is claimed is:

1. A method of performing surface treatment of a first tool such that a discharging operation is performed by using a first electrode which is: (a) made of a green compact obtained by compression-molding one of a metal powder, a powder of a metal compound or a powder of a ceramic material (b) made of a sintered body of one or more of said powders or (c) made of a metal or a metal compound; such that a hard coating film is formed on the tip of said first tool, said method of performing surface treatment comprising:

securing said first electrode to an indexing unit which indexes the angle of said first electrode;

changing said first tool which is connected and secured to a main shaft which is moved vertically, to a second tool or a second electrode by an automatic tool changing unit when an operation for modifying the surface of said first electrode is performed;

modifying said first electrode into a predetermined shape (a) by machining which is performed by said second tool or (b) by a discharging operation which is performed by said second electrode;

changing said second tool or said second electrode connected and secured to said main shaft to said first tool by said automatic tool changing unit;

indexing said first electrode to a predetermined angle of rotation by said indexing unit;

causing discharge to occur while relatively moving the tip of said first tool along the surface of said first electrode such that the tip is made to be opposite to the surface of said first electrode while a predetermined distance is maintained; and forming a hard coating film on the tip of said first tool.

2. The method of performing surface treatment of a first tool according to claim 1, wherein the outside shape of said first electrode secured to said indexing unit is formed into a polygonal shape.

3. The method of performing surface treatment of a first tool according to claim 1, wherein the outside shape of said first electrode secured to said indexing unit is formed into a circular arc shape.

4. The method of performing surface treatment of a first tool according to claim 1, wherein a circular-arc electrode and a polygonal electrode are secured to said indexing unit.

5. A method of performing surface treatment of a first tool such that a discharging operation is performed by using a first electrode which is (a) made of a green compact obtained by compression-molding one of a metal powder, a powder of a metal compound or a powder of a ceramic material, (b) made of a sintered body of one or more of said powders or (c) made of a metal or a metal compound; such that a hard coating film is formed on the tip of said first tool, said method of performing surface treatment of a tool comprising:

securing said first electrode to an indexing unit which indexes the angle of said first electrode;

connecting and securing said first tool to a first main shaft which is operable to move vertically;

modifying said first electrode to a predetermined shape (a) by machining said first electrode with a second tool or (b) by a discharging operation which is performed by a second electrode when an operation for modifying the surface of said first electrode is performed, said second tool and said second electrode being connected and secured to a second main shaft which is provided individually from said first main shaft and which is operable to move vertically;

indexing said first electrode to a predetermined angle of rotation by said indexing unit;

causing discharge to occur while relatively moving the tip of said first tool along the surface of said first electrode such that the tip is made to be opposite to the surface of said first electrode while a predetermined distance is being maintained; and forming a hard coating film on the tip of said first tool.

6. The method of performing surface treatment of a first tool according to claim 5, wherein the outside shape of said first electrode secured to said indexing unit is formed into a polygonal shape.

7. The method of performing surface treatment of a first tool according to claim 5, wherein the outside shape of said first electrode secured to said indexing unit is formed into a circular arc shape.

8. The method of performing surface treatment of a first tool according to claim 5, wherein a circular-arc electrode and a polygonal electrode are secured to said indexing unit.

9. An apparatus for performing surface treatment of a first tool such that a discharging operation is performed by using a first electrode which is (a) made of a green compact obtained by compression-molding one of a metal powder, a powder of a metal compound or a powder of a ceramic material, (b) made of a sintered body of one or more of said powders, or (c) made of a metal or a metal compound; such that a hard coating film is formed on the tip of said first tool, said apparatus for performing surface treatment of a first tool comprising:

an indexing unit for supporting said first electrode and indexing the angle of said first electrode;

a main shaft which supports a rotating unit and which is operable to move vertically;

a first tool supported by said rotating unit;

accommodating means which is capable of accommodating (a) at least one of a modifying tool or a modifying electrode and (b) a tool which is a material which must be processed;

a second modifying tool or a second modifying electrode accommodated in said accommodating means;

an automatic tool changing unit for automatically changing said first tool or said first electrode supported by said rotating unit to said second tool or said second electrode accommodated in said accommodating means;

an X-axis drive unit, a Y-axis drive unit and a Z-axis drive unit for relatively moving said main shaft and said first electrode in directions X, Y and Z, wherein said first tool supported by said rotating unit is changed to said second tool or said second electrode by said automatic tool changing unit when an operation for modifying the surface of said first electrode is performed;

said first electrode is modified into a predetermined shape (a) by machining which is performed by said second tool or (b) by a discharging operation which is performed by said second electrode;

said second tool or said second electrode is changed to said first tool by said automatic tool changing unit;

said first electrode is indexed to a predetermined angle of rotation by said indexing unit;

discharge is caused to occur while the tip of said first tool is being moved relatively along the surface of said first electrode such that the tip is made to be opposite to the surface of said first electrode while a predetermined distance is being maintained by said X-axis drive unit, said Y-axis drive unit and said Z-axis drive unit; and a hard coating film is formed on the tip of said first tool.

10. The apparatus for performing surface treatment of a first tool according to claim 9, wherein the outside shape of said first electrode secured to said indexing unit is formed into a polygonal shape.

11. The apparatus for performing surface treatment of a first tool according to claim 9, wherein the outside shape of said first electrode secured to said indexing unit is formed into a circular arc shape.

12. The apparatus for performing surface treatment of a first tool according to claim 9, wherein a circular-arc electrode and a polygonal electrode are secured to said indexing unit.

13. An apparatus for performing surface treatment of a first tool such that a discharging operation is performed by using a first electrode which is made of (a) a green compact obtained by compression-molding one of a metal powder, a powder of a metal compound or a powder of a ceramic material or (b) metal; such that a hard coating film is formed on the tip of said first tool, said apparatus for performing surface treatment of a tool comprising:

an indexing unit for supporting said first electrode and indexing the angle of said first electrode;

a first main shaft which supports a rotating unit and which operable to move vertically;

a first tool supported by said rotating unit;

a second tool or a second electrode connected and secured to a second main shaft, said second main shaft is provided individually from said first main shaft and is operable to move vertically;

an X-axis drive unit, a Y-axis drive unit and a Z-axis drive unit for relatively moving said first main shaft and said first electrode in directions X, Y and Z, wherein said first electrode is modified into a predetermined shape (a) by machining which is performed by said second tool or (b) by a discharging operation which is performed by said second electrode when modification of the surface of said first electrode is performed;

said first electrode is indexed to a predetermined angle of rotation by said indexing unit;

discharge is caused to occur while relatively moving the tip of said first tool along the surface of said first electrode such that the tip is made to be opposite to the surface of said first electrode while a predetermined distance is being maintained by said rotating unit, said X-axis drive unit, said Y-axis drive unit and said Z-axis drive unit; and a hard coating film is formed on the tip of said first tool.

14. The apparatus for performing surface treatment of a first tool according to claim 13, wherein the outside shape of said first electrode secured to said indexing unit is formed into a polygonal shape.

15. The apparatus for performing surface treatment of a first tool according to claim 13, wherein the outside shape of said first electrode secured to said indexing unit is formed into a circular arc shape.

16. The apparatus for performing surface treatment of a first tool according to claim 13, wherein a circular-arc electrode and a polygonal electrode are arranged so as to be secured to said indexing unit.

* * * * *